United States Patent
Shepherd et al.

(10) Patent No.: US 7,619,846 B2
(45) Date of Patent: Nov. 17, 2009

(54) SELF-SERVO WRITING USING STAGED PATTERNING

(75) Inventors: Stan Shepherd, Morgan Hill, CA (US); S. Craig Smith, Sunnyvale, CA (US); Yu Sun, Fremont, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/750,767

(22) Filed: May 18, 2007

(65) Prior Publication Data
US 2008/0013202 A1    Jan. 17, 2008

Related U.S. Application Data

(60) Provisional application No. 60/747,764, filed on May 19, 2006.

(51) Int. Cl.
*G11B 21/02* (2006.01)
(52) U.S. Cl. ....................................................... 360/75
(58) Field of Classification Search ........................ None
See application file for complete search history.

(56) References Cited

U.S. PATENT DOCUMENTS

| | | | |
|---|---|---|---|
| 5,668,679 A | 9/1997 | Swearingen et al. | |
| 6,304,407 B1 | 10/2001 | Baker et al. | |
| 6,466,385 B1 * | 10/2002 | Umeda et al. | 360/16 |
| 6,507,450 B1 | 1/2003 | Elliott | |
| 6,519,107 B1 * | 2/2003 | Ehrlich et al. | 360/75 |
| 6,519,187 B2 | 2/2003 | Wada | |
| 6,731,446 B2 | 5/2004 | Ikeda et al. | |
| 6,775,091 B1 | 8/2004 | Sutardja | |
| 6,965,491 B1 | 11/2005 | Perlmutter et al. | |
| 6,977,789 B1 * | 12/2005 | Cloke | 360/75 |
| 6,985,316 B1 | 1/2006 | Liikanen et al. | |
| 6,987,636 B1 | 1/2006 | Chue et al. | |
| 6,992,848 B1 | 1/2006 | Agarwal et al. | |
| 6,999,261 B2 * | 2/2006 | Sugiyama et al. | 360/75 |
| 7,068,459 B1 * | 6/2006 | Cloke et al. | 360/75 |
| 7,088,533 B1 * | 8/2006 | Shepherd et al. | 360/51 |
| 7,116,511 B2 * | 10/2006 | Ehrlich | 360/75 |
| 7,133,239 B1 * | 11/2006 | Hartman et al. | 360/75 |
| 7,145,744 B1 | 12/2006 | Clawson et al. | |
| 7,167,333 B1 | 1/2007 | Liikanen et al. | |
| 7,206,157 B2 * | 4/2007 | Ehrlich | 360/75 |
| 7,209,312 B1 | 4/2007 | Sutardja | |
| 7,230,786 B1 * | 6/2007 | Ray et al. | 360/75 |
| 7,256,956 B2 * | 8/2007 | Ehrlich | 360/75 |
| 7,307,807 B1 * | 12/2007 | Han et al. | 360/75 |
| 7,433,143 B1 * | 10/2008 | Ying et al. | 360/51 |
| 7,468,855 B1 * | 12/2008 | Weerasooriya et al. | 360/75 |
| 7,471,481 B2 * | 12/2008 | Lau et al. | 360/75 |
| 2006/0171058 A1 | 8/2006 | Chan et al. | |
| 2007/0211369 A1 * | 9/2007 | Yang et al. | 360/75 |
| 2007/0253084 A1 * | 11/2007 | Annampedu et al. | 360/39 |

* cited by examiner

*Primary Examiner*—K. Wong
(74) *Attorney, Agent, or Firm*—Fellers, Snider et al.

(57) ABSTRACT

An apparatus and method for servo writing are disclosed. The method includes writing of first servo data to a medium, detecting a velocity integrated position of the first servo data, and writing second servo data in relation to the detected position of the first servo data.

19 Claims, 5 Drawing Sheets

SELF-SERVO WRITING USING STAGED PATTERNING

RELATED APPLICATIONS

The present application makes a claim of domestic priority to U.S. Provisional Patent Application No. 60/747,764 filed May 19, 2006.

BACKGROUND

The present case is generally directed to servo data and more particularly, to the writing of final servo data based on initial servo data. Servo data are often used in a control system to provide feedback positional control for a control object. In the environment of a data storage device, such data can be used to detect and control the position of a read/write transducer adjacent a rotatable storage medium.

The servo data can be provided in a number of ways. In one approach, a servo track writer engages a data storage device to write an initial set of servo data to the storage media mounted therein. The initial servo data can take a number of forms, such as a series of spaced apart spirals that extend across the media surfaces from an outermost diameter (OD) to an innermost diameter (ID). Final servo data are thereafter written by the device using the initial servo data as a prewritten positional reference.

SUMMARY

Various embodiments of the present invention are generally directed to the writing of first servo data to a medium, detecting a velocity integrated position of said first servo data, and writing second servo data in relation to the detected position of the first servo data.

In some embodiments, a method comprises using a transducer to write a radially extending first servo pattern across a radius of a medium in a data storage device, sweeping the transducer across the medium during a detection seek to detect a position error of a medial portion of the first servo pattern, and using the transducer to write a second servo pattern to the medium in relation to said detected position error.

In other embodiments, an apparatus comprises a controller of a data storage device configured to direct a transducer of the device to write a radially extending first servo pattern across a radius of a medium of the device, to subsequently execute a detection seek to sweep the transducer across the medium to detect a position error of a medial portion of the first servo pattern, and to direct the transducer to subsequently write a second servo pattern to the medium in relation to said detected position error.

In further embodiments, an apparatus comprises a moveable transducer adjacent a storage medium; and first means for using the transducer to write a radially extending first servo pattern across a radius of a medium in a data storage device, for sweeping the transducer across the medium during a detection seek to detect a position error of a medial portion of the first servo pattern, and for using the transducer to write a second servo pattern to the medium in relation to said detected position error.

DETAILED DESCRIPTION

Figure 1:
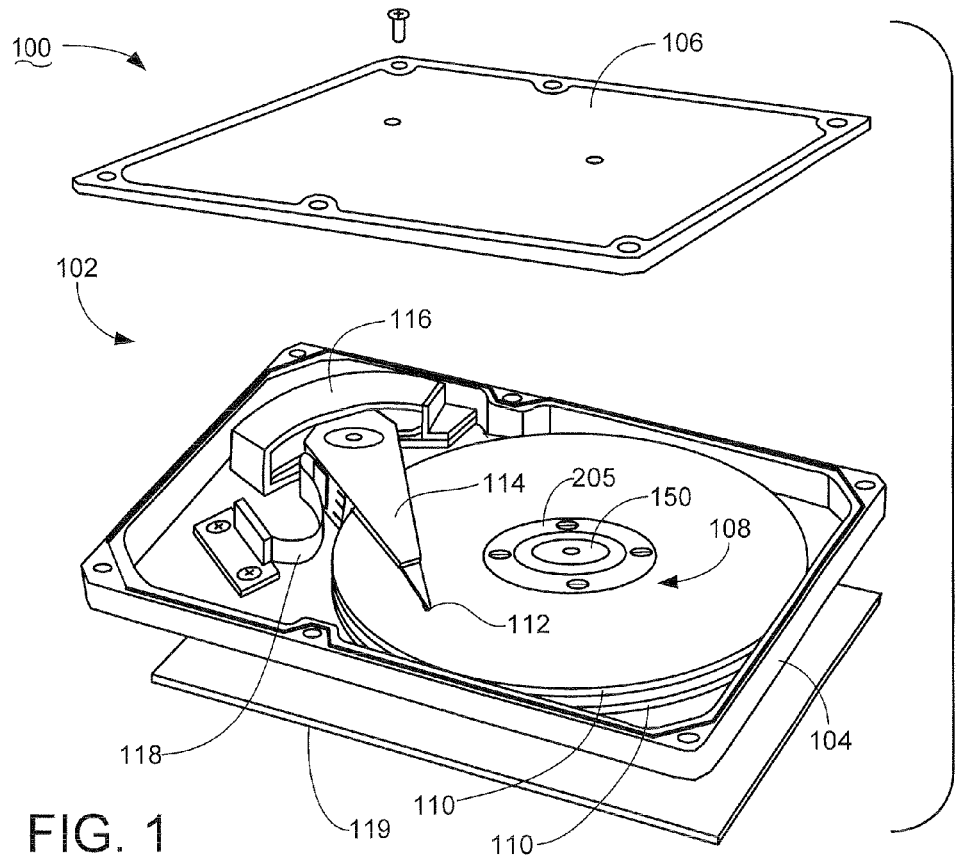
FIG. 1 shows an exemplary data storage device.

FIG. 1 generally illustrates a data storage device 100 to provide an exemplary environment in which various embodiments of the present invention can be advantageously practiced. The device is preferably characterized as a hard disk drive, although such is not limiting.

The device 100 includes a housing 102 formed from a base deck 104 and top cover 106. An internally disposed spindle motor 108 is configured to rotate a number of storage media 110. An array of read/write transducers (heads) 112 access data tracks defined on the defined on the media surfaces to transfer data between the media 110 and a host device.

An actuator 114 moves the transducers 112 through application of current to a voice coil motor (VCM) 116. A flex circuit assembly 118 provides electrical communication paths between the actuator 112 and device control electronics on an externally disposed printed circuit board (PCB) 119.

Figure 2:
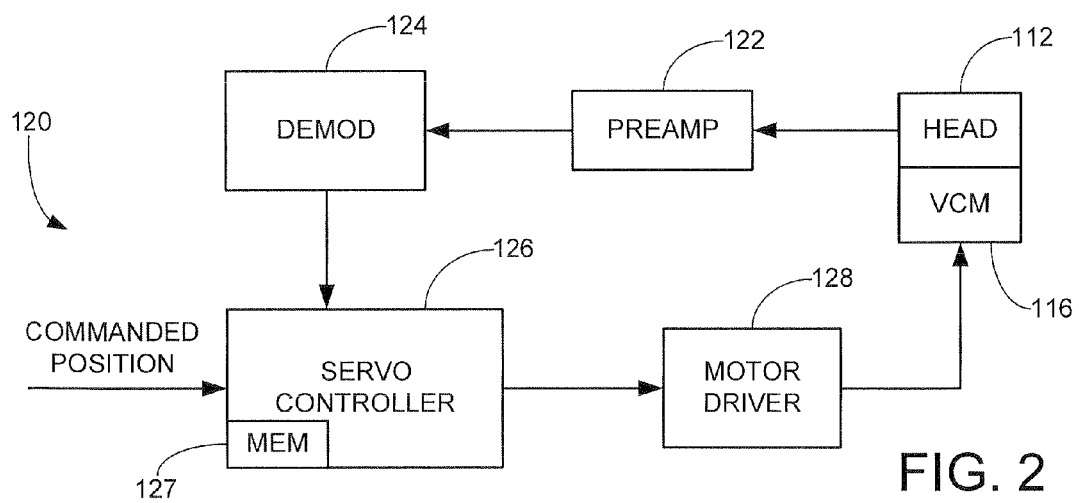
FIG. 2 provides a functional block diagram of a servo circuit of the device of FIG. 1.

FIG. 2 provides a generalized functional block diagram for a closed loop servo control circuit 120 of the device 100. Embedded servo data are transduced from the media 110 by a selected transducer 112 and provided to a preamplifier/driver (preamp) circuit 122. The preamp circuit 122 preamplifies and filters the readback signals from the transducer 112, and provides the processed servo data to a demodulation (demod) circuit 124.

The demod circuit 124 detects and conditions the servo data, including application of automatic gain control (AGC) and conversion of the signals to digital form. A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code in memory 127 to direct the operation of the servo loop, although the controller can take other forms including being partially or fully realized in hardware. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

Figure 3:
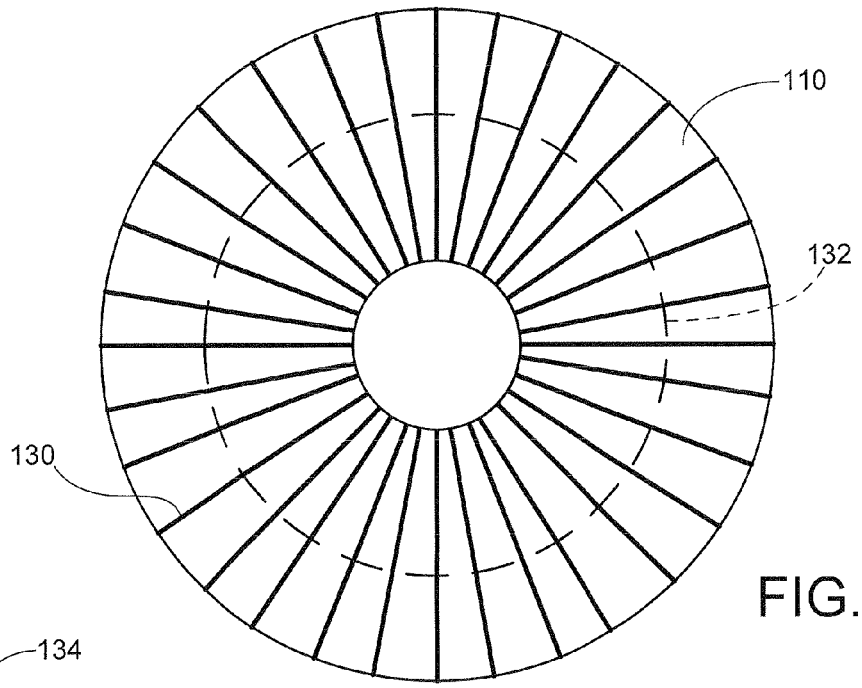
FIG. 3 generally illustrates exemplary final servo data on a storage medium of the device.

The embedded servo data are arranged on each recording surface as shown in FIG. 3. A series of spaced apart servo wedges 130 contiguously extend like spokes of a wheel from an outermost diameter (OD) to an innermost diameter (ID) of the recording surface. The servo wedges 130 define adjacent concentric servo data tracks on the media, such as generally represented at 132.

Each servo wedge 130 preferably includes synchronization, automatic gain control (AGC), header, track address (e.g., Grey code), and intra-track positional information (e.g., A-F dibit patterns). These respective fields are demodulated by the servo circuit 120 to control the positioning of the transducer 112 during I/O operations with user data sectors in the regions between adjacent servo wedges 130. The total number of servo wedges 130 will be selected in accordance with the requirements of a given application, and may be on the order of around 200 or more.

In accordance with various embodiments, the final servo data shown in FIG. 3 are written using an iterative process during a self-servo write operation of the device 100. Coarse servo data are initially written to the media surfaces, and this coarse servo data are used to provide increasingly finer, more precise data, ultimately culminating in the final servo wedges 130.

This advantageously allows the servo writing process to be carried out wholly by the device 100 without the need for the use of an externally mounted servo-track writer (STW), or the use of a preprocessing operation (multi-disc writing, printing, etc.) prior to installation of the media 110 into the device 100. It will be appreciated, however, that the claimed invention is not necessarily so limited.

Figure 4:
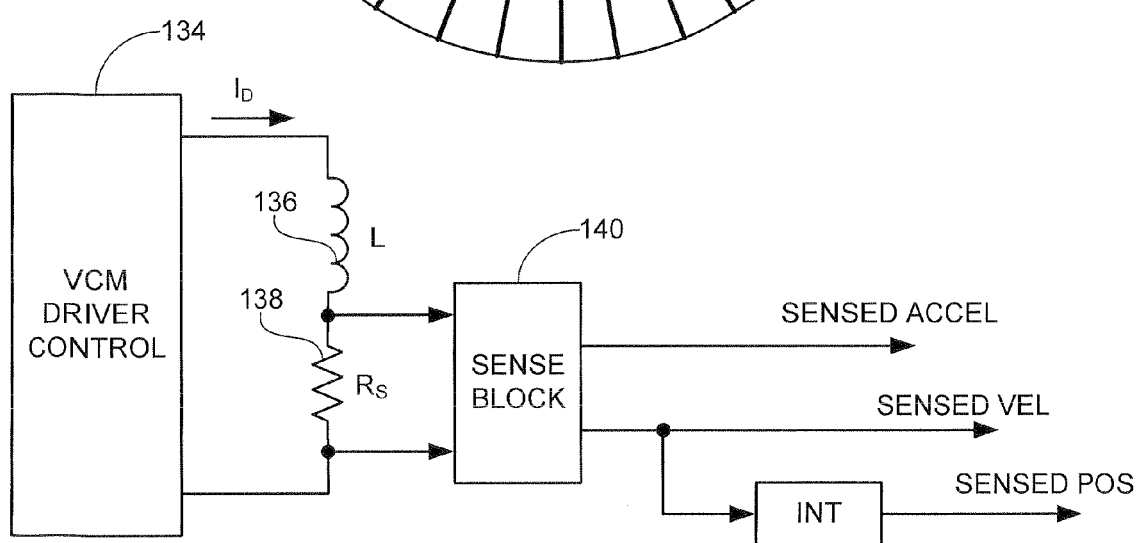
FIG. 4 sets forth servo circuitry used to detect a velocity integrated position value for a servo pattern.

FIG. 4 is a generalized representation of selected portions of the servo circuit 120 of FIG. 2 utilized during the servo writing process. A VCM driver control block 134 provides drive current ID to a VCM coil 136 of the VCM 116 (FIG. 1) in response to a commanded current value. An H-bridge switching configuration is preferably used to facilitate the application of bi-directional currents through the coil 136, but such has been omitted for simplicity of illustration.

A current sense resistor $R_S$ is serially coupled to the coil 136, and the voltage thereacross is sensed by a sense block 140. The sense block 140, portions of which can be incorporated into the servo controller 126, outputs digital representations of instantaneous acceleration and velocity of the associated transducer 112 being moved in response to the drive current ID. The velocity is integrated by integrator block 142 to provide a velocity-integrated position value. In this way, estimates of acceleration, velocity and position can be derived during open loop seek operations.

Figure 5:
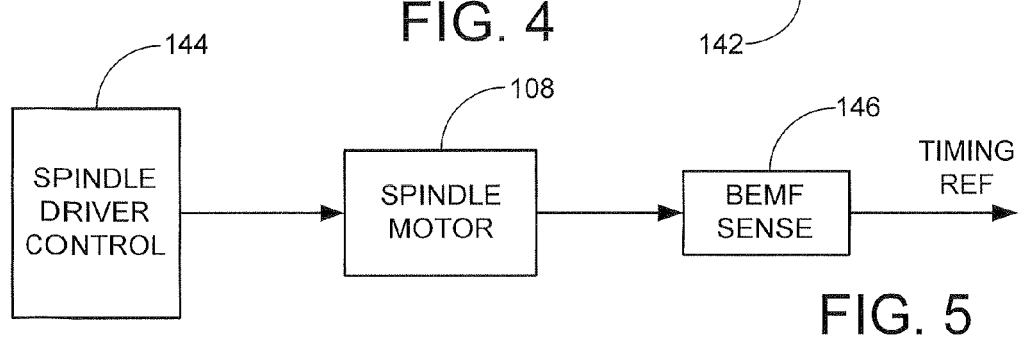
FIG. 5 shows servo circuitry used to detect a timing reference from a spindle motor of the device.

FIG. 5 provides a generalized representation of further portions of the servo control circuit 120 of FIG. 2. A spindle driver control block 144 provides commutated drive pulses to the respective phases of the multi-phase spindle motor 108 in response to a commanded speed value for the motor. A back electromotive force (BEMF) block 146 provides a rotational timing reference in relation to detected zero crossings of respective phase voltages. This provides a once-around timing pulse as well as other timing references during the ongoing rotation of the media 110 at the selected velocity.

Figure 6:
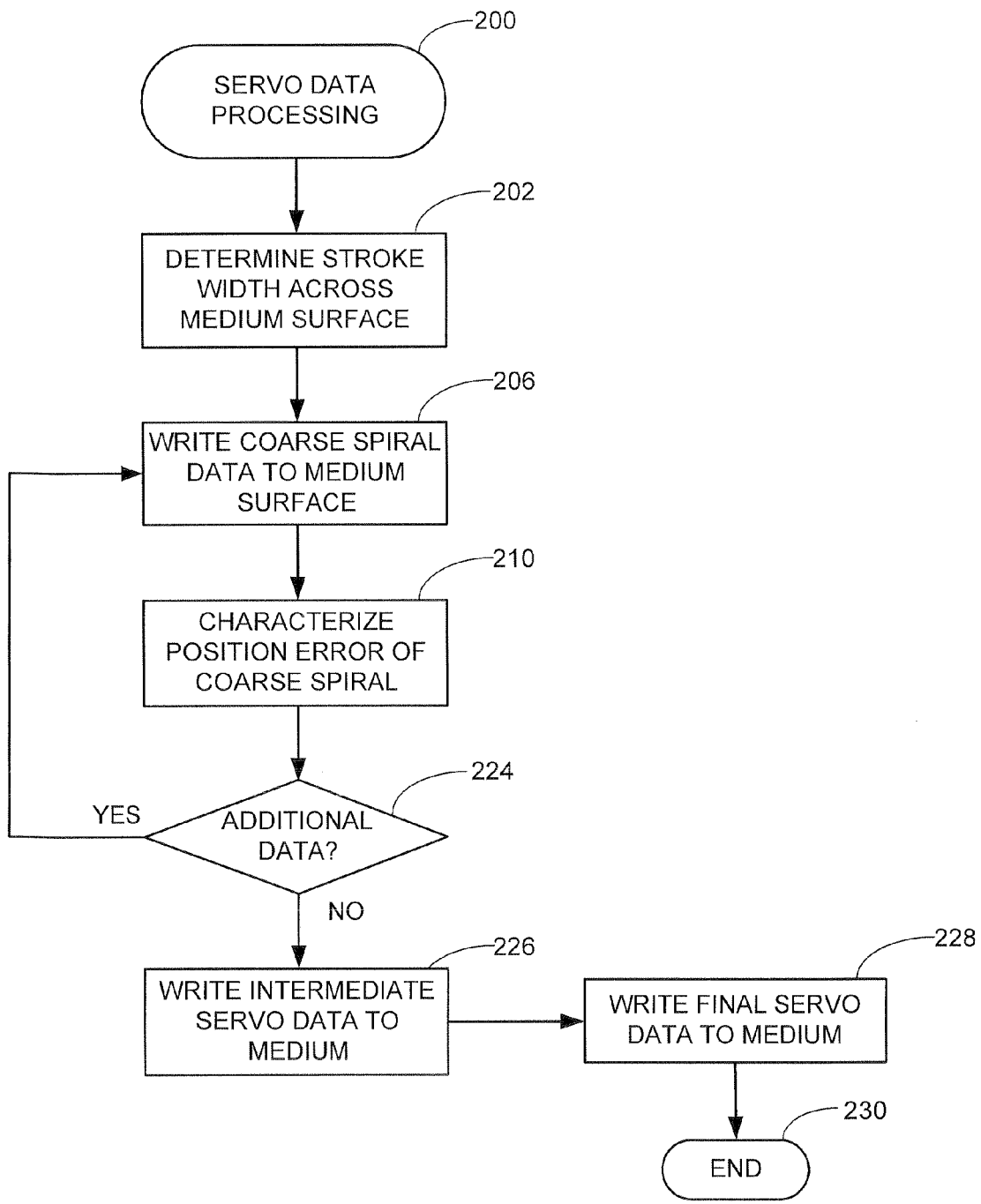
FIG. 6 provides a flow chart for a SERVO DATA PROCESSING routine, generally illustrative of steps carried out in accordance with various embodiments of the present invention to provide servo data for a control system such as the device of FIG. 1.

The circuitry of FIGS. 4-5 are utilized during a SERVO DATA PROCESSING routine 200 of FIG. 6, generally illustrative of steps carried out in accordance with various embodiments to generate the final servo data of FIG. 3 onto each of the media surfaces of the device 100 in turn.

Figure 7:
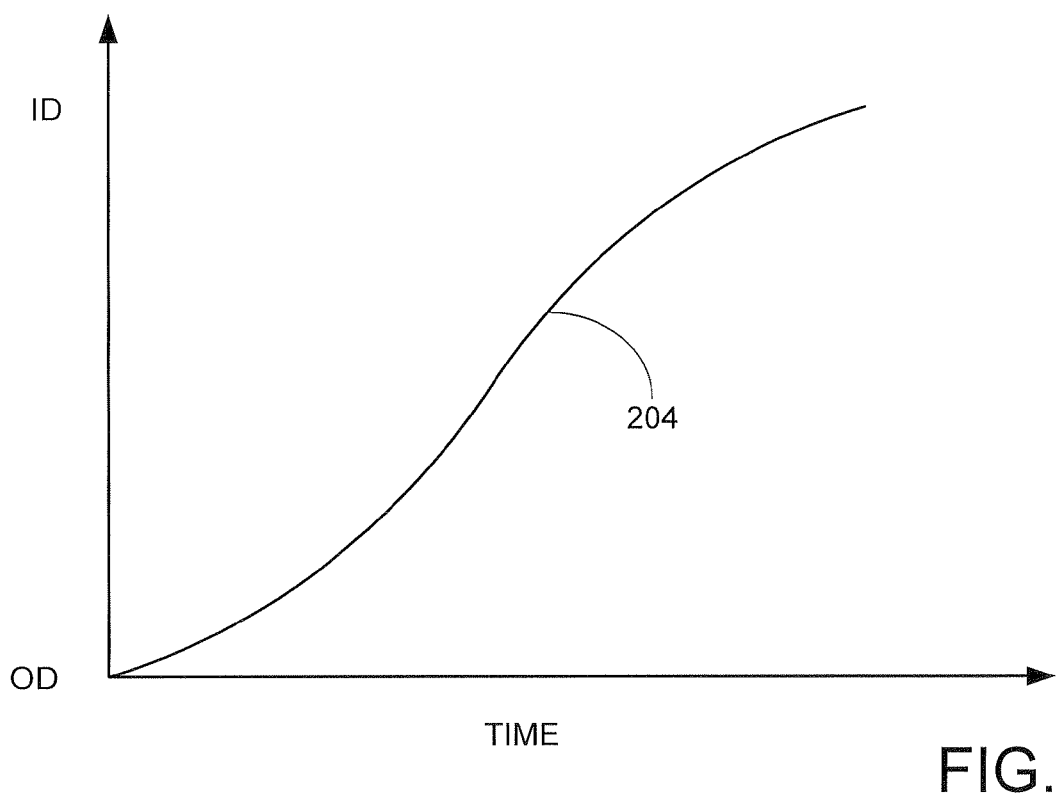
FIG. 7 shows positional displacement during a seek carried out by the routine of FIG. 6.

At step 202, an overall available stroke length is first determined to accurately identify the available stroke, or radial distance, available to store the final servo data across the recording surface. As shown by a seek displacement curve 204 in FIG. 7, the selected transducer 112 is initially biased against an outermost limit stop adjacent the OD. An open loop seek is performed in accordance with a selected seek profile to advance the transducer 112 to a position adjacent an innermost limit stop at the ID.

One or more of the detected states of the transducer of FIG. 4 (e.g., acceleration, velocity and/or position) are monitored during the seek and the second limit stop is detected in relation to a substantial change in the monitored state. Multiple such seeks are preferably carried out in both directions to determine the overall stroke length and associated boundary OD and ID positions. This allows determination of the associated number of servo data tracks to be written, as well as target width and placement values, etc.

Figure 8:
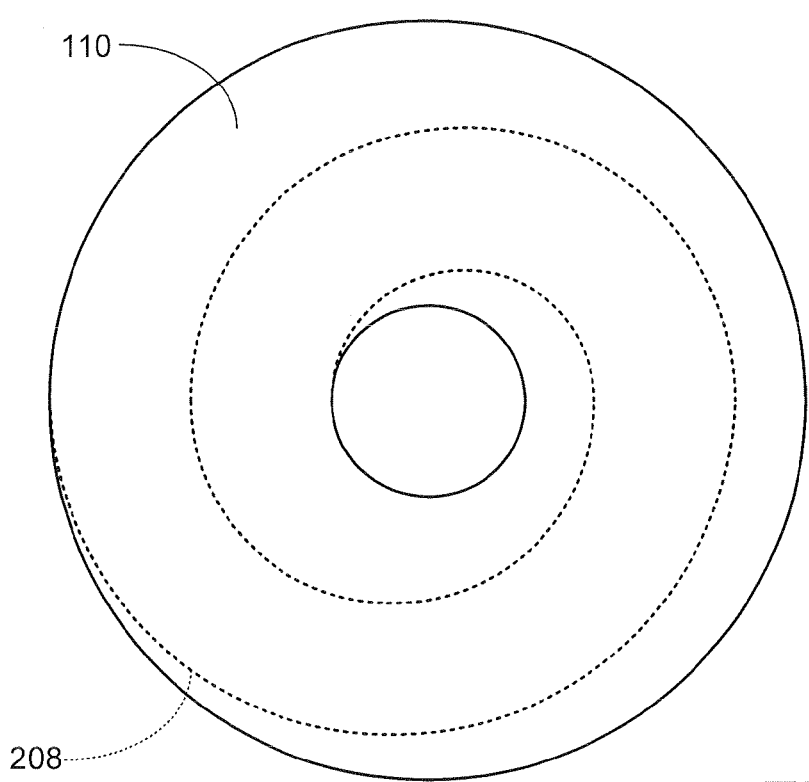
FIG. 8 shows an exemplary coarse servo pattern written during the routine of FIG. 6.

Continuing with the flow of FIG. 6, coarse spiral servo data are next written across the media surface at step 206. Preferably, the coarse servo data written during this pass through step 206 is characterized as a contiguous spiral 208, such as represented in FIG. 8.

The spiral 208 extends from OD to ID, and is written by executing an open loop seek (as tuned during step 202) while asserting a write gate for a write element of the transducer 112 to continuously stream a selected servo pattern as the transducer 112 is swept across the media surface. The particular configuration of the spiral 208, including the total angular phase (i.e., "wrap"), will depend at least in part on the rotational speed of the medium 110 and the velocity of the transducer 112 during the spiral writing operation. A substantially constant velocity seek is contemplated, but not necessarily required. Other patterns can alternatively be used as desired, including segmented spirals that extend only partially across the media surface.

Figure 9:
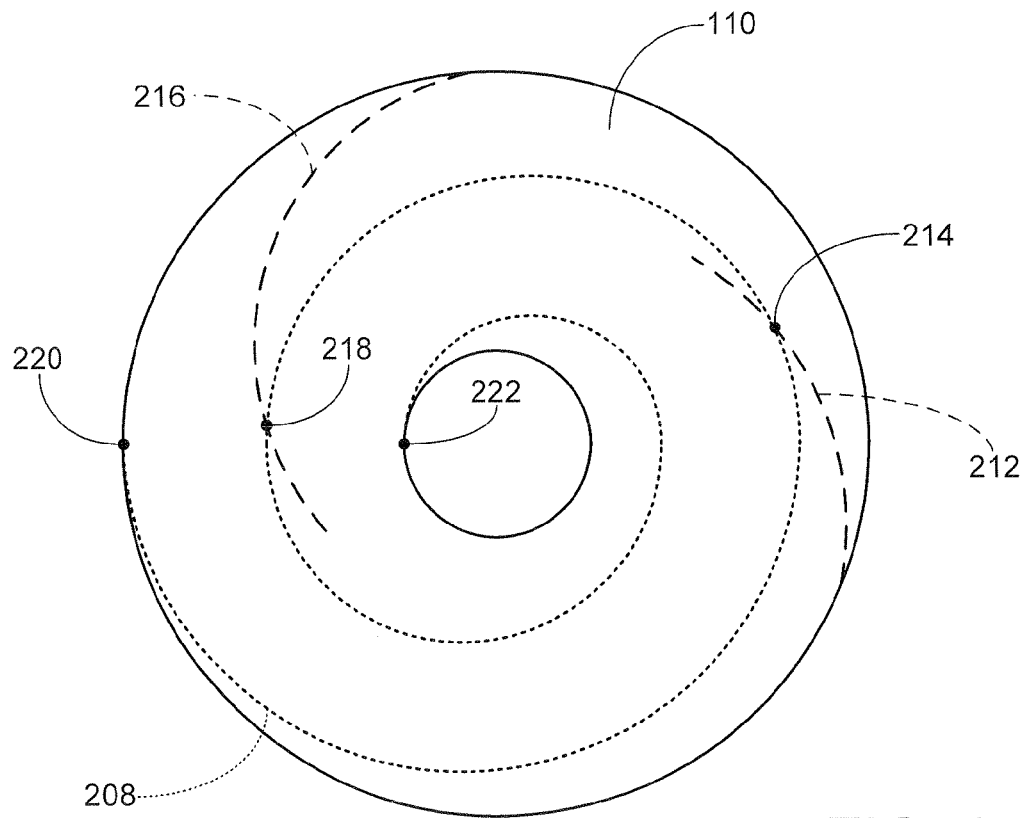
FIG. 9 shows a series of detection seeks used to detect the pattern of FIG. 8.

Position error associated with the coarse servo data is next characterized at step 210 in FIG. 6. This can be carried out by executing a second open loop seek from a selected initial timing and position reference, such as the OD at a selected elapsed time since index, and asserting a read gate for a read element of the transducer 112 to detect a medial portion of the previously written spiral 208. As shown in FIG. 9, a first such detection seek is generally denoted by dashed path 212, and the detection seek crosses the spiral 208 at a medial point 214.

The detection seek 212 is preferably selected to have a different seek profile as compared to the seek used to generate the spiral 208, and will thus cross the spiral 208 either once or a number of successive times depending on a number of factors such as the duration of the seek. Intersection point 214 is detected by monitoring a readback signal from the read element; that is, the transduced readback signal will output the servo pattern of the spiral 208 as the transducer 112 crosses the spiral. At this point a sensed position value of the transducer 112 is obtained via the aforedescribed velocity integration of FIG. 4. Based on the timing and initial position of the detection seek 212, estimates of the angular and rotational position of the cross-over point 214 can be readily determined.

While it is contemplated that some amount of uncertainty will exist in the velocity-integration derived position value, additional detection seeks can be carried out along nominally the same path and averaged to provide a reasonably accurate characterization of the position of the spiral 208. Further detection seeks can be launched from other initial angular positions, such as represented by detection seek 216 and cross-over point 218. The starting and ending locations (points 220, 222) of the spiral 208 can also be detected.

With knowledge of the starting and ending points of the spiral 208, along with the position of one or more medial points of the spiral 208, the overall position of the spiral 208 can be accurately estimated. The deviation of the overall position of the spiral 208 from the desired position that was intended during the writing of the spiral during step 206 (FIG. 6) can also be readily characterized. The position values associated with the spiral 208 are stored in an appropriate memory structure, such a table in controller memory 127 (FIG. 2), for subsequent reference.

Continuing with FIG. 6, decision step 224 determines whether additional coarse servo data are to be written; if so, the steps 206 and 210 are repeated until a first set of coarse servo data are generated on the medium 110. As each additional pattern of coarse servo data is written, the servo pattern can be the same as before, or a new, unique pattern can be used each time.

It will be appreciated that as more and more coarse patterns are provided, the location of previously written patterns will be known, allowing the servo circuit 120 to readily differentiate between the older patterns and the most recent pattern. Moreover, the subsequently written patterns can be provisioned with increasingly greater precision position characterizations since the velocity-integrated position values can be determined in terms of the time since the most recent spiral crossing, rather than the time since the beginning of the detection seek.

Once all of the coarse patterns have been written the routine of FIG. 6 is shown to proceed to step 226 where intermediate servo data are written to the medium 110. It is contemplated that the intermediate servo data of step 226 will constitute another series of spaced apart spirals as previously generated in step 206, with finer, more precise resolution.

The finer resolution of the servo data of step 226 is achieved on the basis that the intermediate servo data are generated using the coarse data as a position reference, along with the known positions of the coarse data as generated from step 210. As before, the position error is decreased on the basis that the various positions are detected in relation to the time since the most recent spiral crossing, rather than the time since the seek was initiated.

Final servo data are thereafter written at step 228, such as in the form of the spaced apart servo wedges 130 of FIG. 3, while servoing off of the intermediate data of step 226, and the routine ends at step 230.

At this point it will be noted that, in an alternative embodiment, the intermediate servo data are not separately generated as set forth above (i.e., step 226 is skipped). Rather, in this embodiment the servo data written during each subsequent pass through steps 206 and 210 result in increasingly higher resolution data so that, at the conclusion of the writing of this data, the final servo data of step 228 can be generated directly therefrom. The term "resolution" generally relates to the fact that the written patterns have greater detail, allowing more measurements of the pattern. As will be appreciated, the number of measurements required per revolution in the final servo data is greater than both the original coarse pattern and the intermediate pattern (if used).

Empirical analysis indicates that open loop seeks as disclosed herein are suitably accurate and repeatable to implement the foregoing embodiments in a wide range of environments. Since error generally tends to propagate the farther away the transducer is from the launching point, detected servo quality can be used as a factor in deciding at which point a transition is made in generating a next set of servo data.

Figure 10:
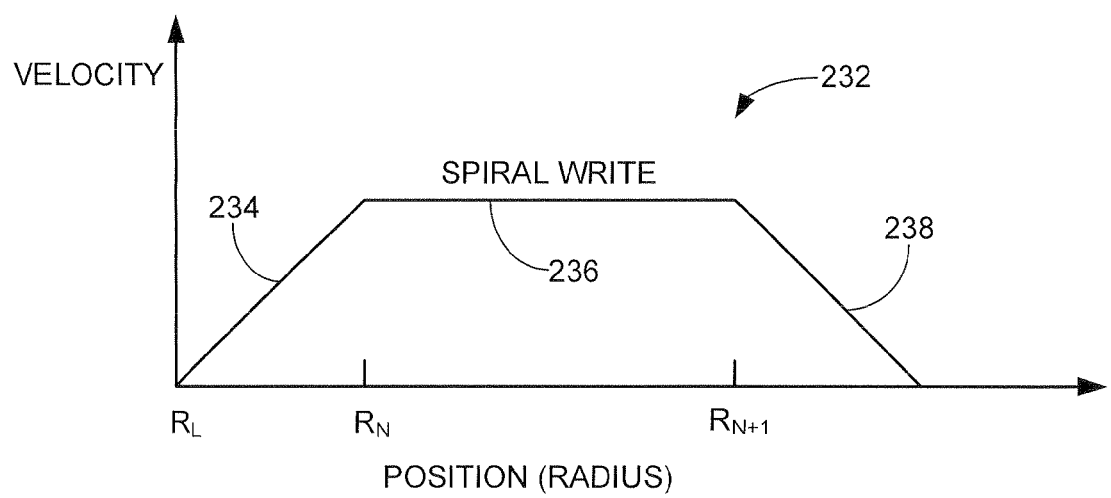
FIG. 10 is an exemplary seek profile used to write servo data during the routine of FIG. 6.

FIG. 10 sets forth a velocity curve 232 that can be used in accordance with the routine of FIG. 6 to write servo data to the medium 110. The curve 232 is particularly suited to generating the coarse and/or intermediate servo data as a sequence of discrete, radially overlapping spiral segments that extend from a first radius on the medium 110 (denoted generally as $R_N$) to a second radius ($R_{N+1}$).

The transducer 112 is accurately positioned at a known launch radius ($R_L$) using the previously determined position information from the existing spirals. From this point, the transducer 112 is accelerated toward the desired write zone, as denoted by acceleration portion 234 in FIG. 10. A selected velocity is reached and maintained for the writing of the servo data segment, as denoted by portion 236. The transducer is thereafter decelerated during portion 238 and the position of the written segment is determined as discussed above.

An advantage of the various embodiments disclosed herein is the ability to use a coarsely-placed, low precision pattern (such as 208) to write a more precisely placed set of data which in turn can be used as a reference for the writing of the final servo data at any selected resolution. This advantageously eliminates the need for a highly precise STW or other mechanism to provide either initial reference patterns or the final servo data. New generations of devices can thus be developed without the time and capital investment required to generate an associated set of STW units or other external mechanisms to aid in the generation of the servo data.

It will be understood that even though numerous characteristics and advantages of various embodiments of the invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising self-servo writing servo data to a storage medium by using a first open loop seek to write a spiral of coarse servo data to the medium, and using a second open loop seek to detect a position error of said spiral.

2. The method of claim 1, wherein the detected position error is characterized in relation to a detected position of an outermost radial location and an innermost radial location of the spiral, and in relation to an integrated velocity of a transducer moved during the second open loop seek as the transducer crosses the spiral.

3. The method of claim 1, wherein the spiral of coarse servo data comprises a contiguous spiral that extends between an outermost diameter (OD) and an innermost diameter (ID) of the medium written as a transducer is continuously moved between said OD and said ID during the first open loop seek.

4. The method of claim 1, further comprising using a third open loop seek to write a second spiral of coarse servo data to the medium in relation to the detected position error, and using position information from the second spiral of coarse servo data to write a plurality of spaced apart servo wedges that radially extend across the medium from said OD to said ID.

5. The method of claim 1, wherein the second open loop seek is carried out by moving a transducer in accordance with a predetermined detection seek profile, and wherein the position error is detected in relation to an integrated velocity value of the transducer obtained as the transducer crosses the spiral.

6. The method of claim 1, wherein the first open loop seek is carried out by constantly moving a transducer at a first commanded non-zero velocity across the medium while writing said spiral, and wherein the second open loop seek is carried out by constantly moving the transducer at a different, second commanded non-zero velocity across the medium so as to pass over the spiral.

7. The method of claim 6, wherein a duration of the first open loop seek and a magnitude of the first commanded non-zero velocity are selected to move the transducer from a selected one of an innermost diameter (ID) or outermost (OD) of the medium to a remaining one of the ID or OD.

8. The method of claim 6, wherein a duration of the second open loop seek and a magnitude of the second commanded non-zero velocity are selected to move the transducer from a selected one of an innermost diameter (ID) or outermost (OD) of the medium to a remaining one of the ID or OD.

9. The method of claim 1, further comprising storing the detected position error in a memory structure.

10. An apparatus comprising a controller of a data storage device configured to direct a transducer of the device to self-servo write servo data to a storage medium by using a first open loop seek to write a spiral of coarse servo data to the medium, and using a second open loop seek to detect a position error of said spiral.

11. The apparatus of claim 10, wherein the position error is further characterized in relation to detected position of an outermost radial location and an innermost radial location of the spiral.

12. The apparatus of claim 10, wherein the controller further directs the transducer to carry out a third open loop seek to write a second spiral of coarse servo data to the medium in relation to the position error detected during the second open loop seek.

13. The apparatus of claim 10, wherein the second open loop seek is carried out by moving the transducer at a selected velocity, and wherein the position error is detected by integrating said velocity as the transducer crosses the spiral.

14. The apparatus of claim 10, wherein the first open loop seek is carried out by constantly moving the transducer at a first commanded non-zero velocity across the medium while writing said spiral, and wherein the second open loop seek is carried out by constantly moving the transducer at a different, second commanded non-zero velocity across the medium so as to intersect the spiral.

15. The apparatus of claim 10, wherein a duration of the first open loop seek is selected to move the transducer from a selected one of an innermost diameter (ID) or outermost (OD) of the medium to a remaining one of the ID or OD.

16. The apparatus of claim 10, wherein a duration of the second open loop seek is selected to move the transducer from a selected one of an innermost diameter (ID) or outermost (OD) of the medium to a remaining one of the ID or OD.

17. An apparatus comprising:
a moveable transducer adjacent a storage medium; and
first means for using a succession of open loop seeks of the transducer to self-servo write servo data to the storage medium;
wherein the first means is characterized as a servo controller of a data storage device in which the transducer and the medium are disposed, wherein the servo controller directs the transducer to carry out a first open loop seek to write a spiral of coarse servo data to the medium, and to carry out a second open loop seek to detect a position error of said spiral.

18. The apparatus of claim 17, wherein the servo controller further directs the transducer to carry out a third open loop seek to write a second spiral of coarse servo data to the medium in relation to the detected position error.

19. The apparatus of claim 17, wherein the servo controller further directs the transducer to write a plurality of spaced apart servo wedges that radially extend across the medium from said OD to said ID in relation to position information from the second spiral.

* * * * *